March 16, 1971     M. L. STONE     3,570,086

METHODS AND MACHINE FOR MANUFACTURE OF EXPANDED METAL

Filed April 21, 1969     4 Sheets-Sheet 1

INVENTOR
MARK L. STONE
by Hume, Clement, Hume & Lee
ATTORNEYS

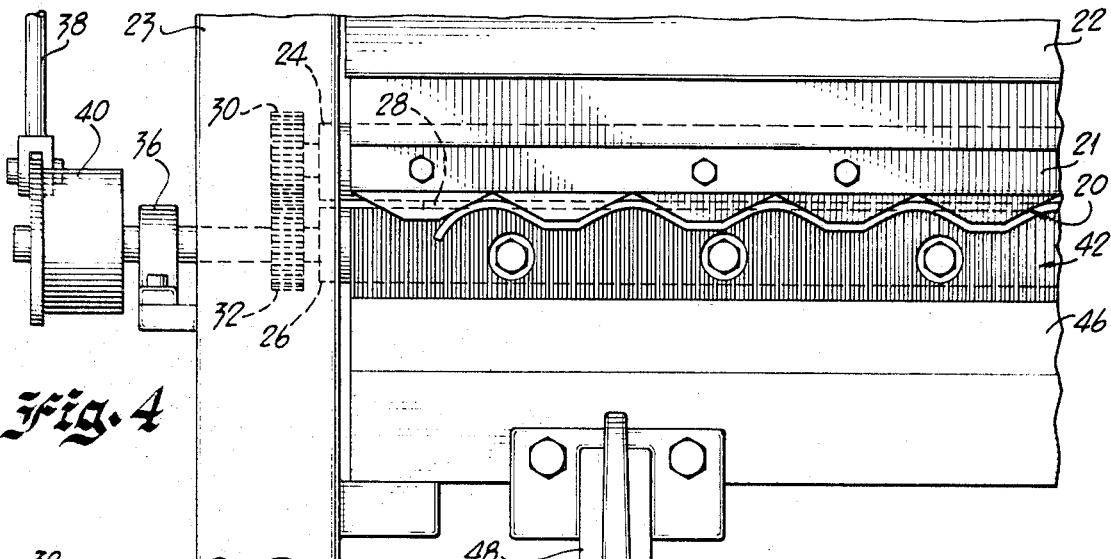
Fig. 4
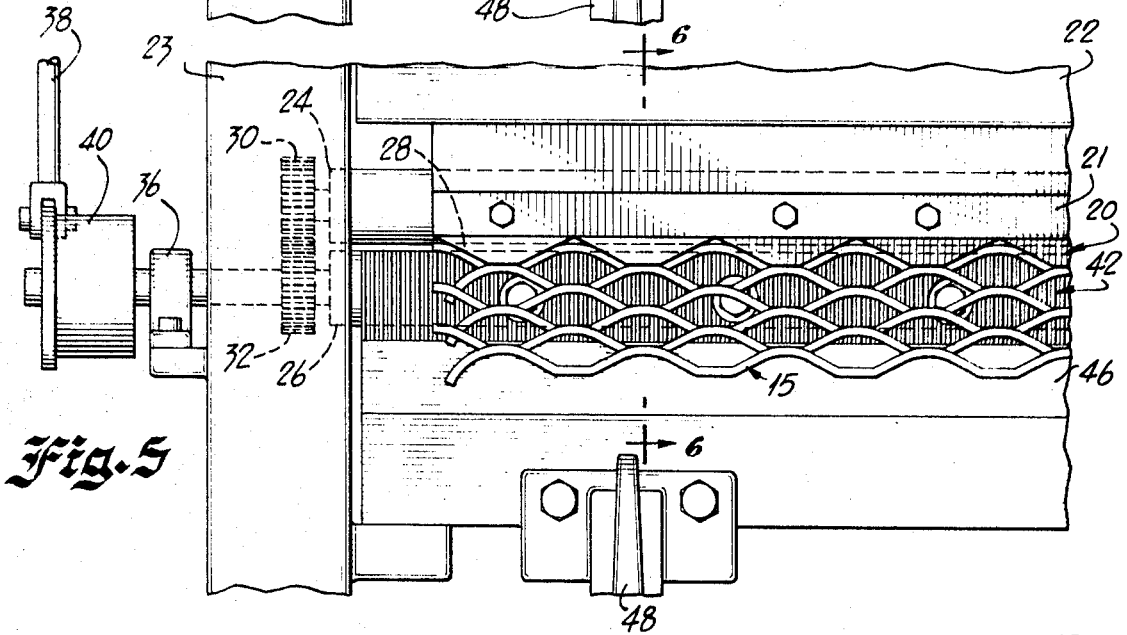
Fig. 5
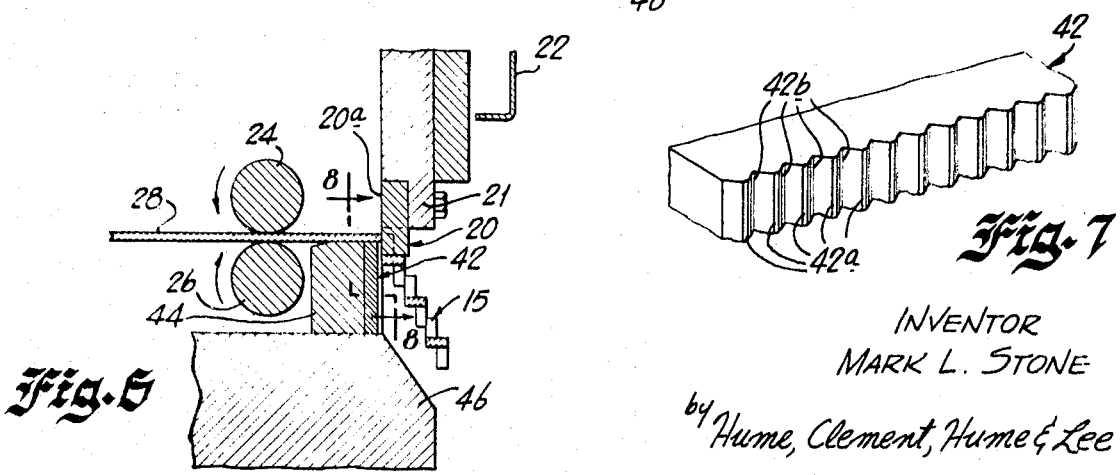
Fig. 6
Fig. 7
INVENTOR
MARK L. STONE
by Hume, Clement, Hume & Lee
ATTORNEYS

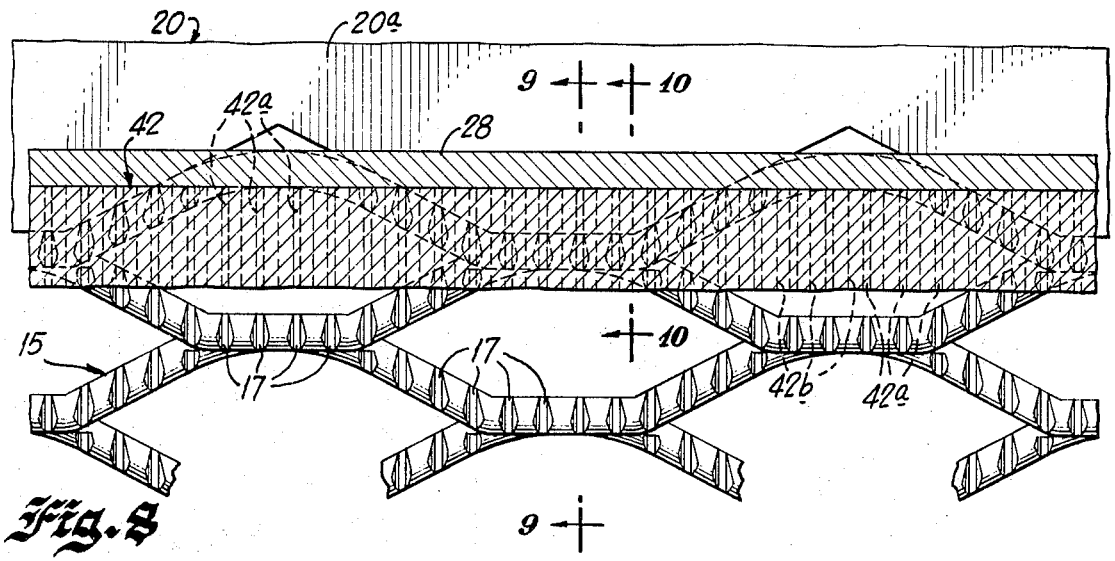
Fig. 8
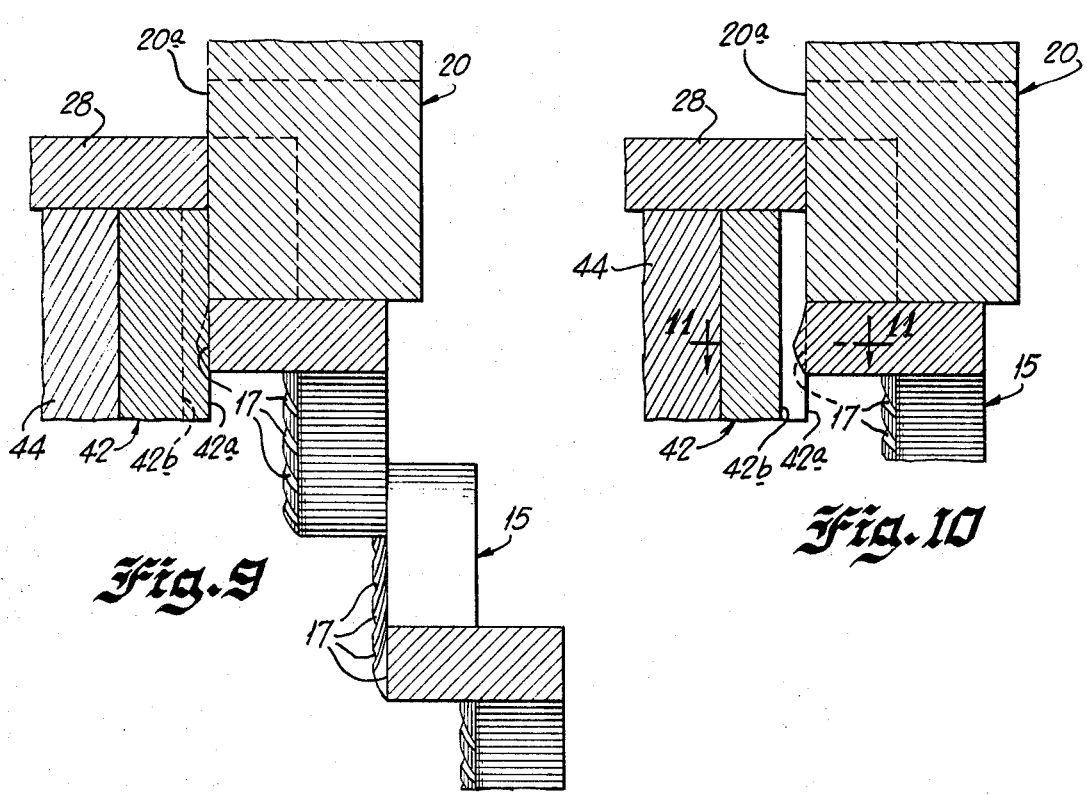
Fig. 9
Fig. 10
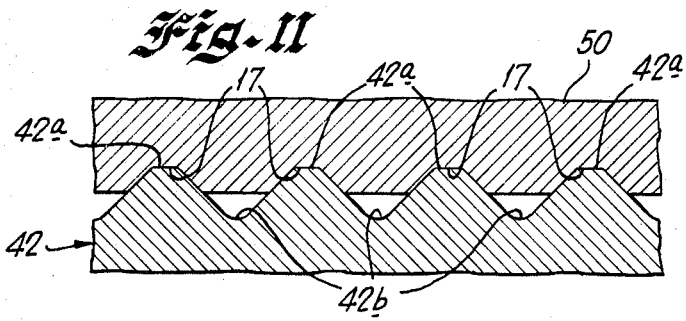
Fig. 11
INVENTOR
MARK L. STONE
by Hume, Clement,
Hume & Lee
ATTORNEYS

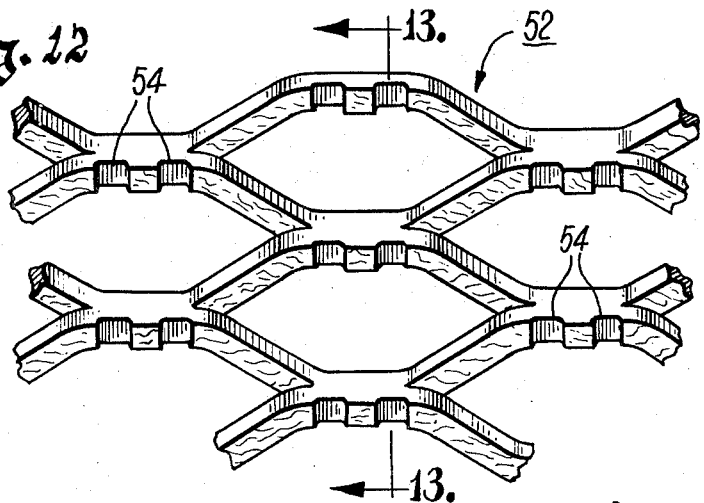
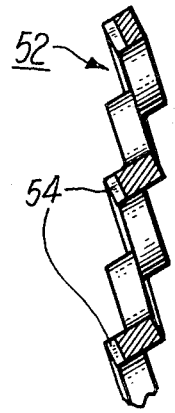
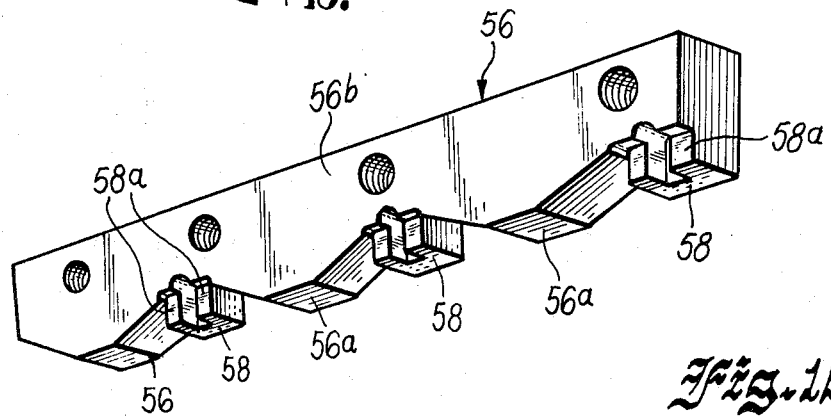
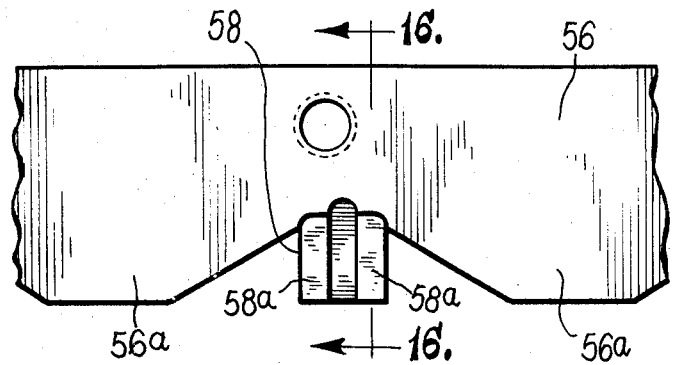
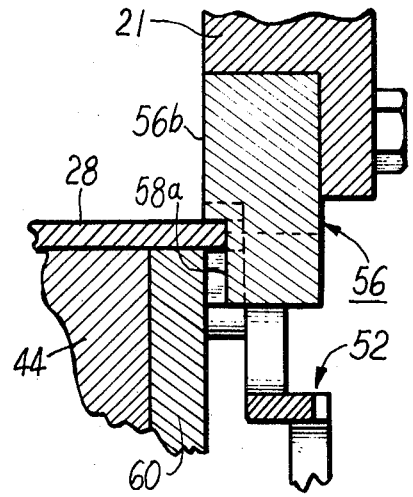

United States Patent Office 3,570,086
Patented Mar. 16, 1971

1

3,570,086
METHODS AND MACHINES FOR MANUFACTURE OF EXPANDED METAL
Mark M. Stone, Highland Park, Ill., assignor to Metalex Corporation, Libertyville, Ill.
Continuation-in-part of abandoned application Ser. No. 676,531, Oct. 19, 1967. This application Apr. 21, 1969, Ser. No. 825,098
Int. Cl. B21d 31/04
U.S. Cl. 29—6.2                                14 Claims

ABSTRACT OF THE DISCLOSURE

Methods and machines are disclosed for manufacturing an expanded metal product having a roughened or serrated surface portion adapting the product for use as a non-skid safety walkway or the like. A multi-toothed punching die is reciprocated in a vertical plane with its vertical interior face closely adjacent the vertically oriented die face of an expanding ledge. Sheet metal is advanced along a horizontal bed toward the ledge in timed relation to reciprocation of the punching die which die is also shifted laterally between successive downward strokes to establish the offset aperture pattern of expanded metal. One and only one of the opposed vertical faces of the dies is provided with serrating die means while the other die face is preferably of a planar contour or otherwise formed so as not to interregister with the serrating die.

REFERENCE TO RELATED APPLICATIONS

The present application is a continuation-in-part of application Ser. No. 676,531, filed Oct. 19, 1967, and now abandoned, for "Method and Machine for Manufacture of Expanded Metal" and assigned to the same assignee as the present invention.

The expanded metal products illustrated in FIGS. 1 and 12 herein are the subjects of design patent application Ser. No. 10,588, now Design Pat. No. 212,354, and design application Ser. No. 16,835, filed concurrently herewith, now Design Pat. No. 218,597.

BACKGROUND OF THE INVENTION

The present invention is concerned with new and improved methods and machines for manufacturing expanded metal products having roughened or serrated surface portions, such products being useful as non-skid safety walkways or the like.

The manufacture of expanded metal by the use of a so-called guillotine-type cutting die to slit and expand sheet metal stock is well known to the art and a suitable machine therefor is illustrated in Pat. No. 2,244,305. Briefly, in this machine, sheet metal stock is advanced along a horizontal bed toward a shearing and expanding ledge whereat a vertically reciprocating guillotine punching die slits and expands the sheet metal as it is advanced toward the ledge in timed synchronism with the movement of the guillotine blade. Alternatively, the sheet metal may be slit prior to the expanding step. At any rate, a staggered or offset aperture pattern is conventionally provided in the expanded metal by laterally shifting the guillotine blade back and forth between successive downward expanding strokes and conventional pneumatic control apparatus is employed to effect this end.

To provide the expanded metal with a roughened or scored surface portion, the above machine is typically modified by providing a serrated lower die in fixed alignment with the vertical face of the expanding ledge and by further providing complementary serrations on the adjacent interior face of the movable guillotine die. The interregistration of the serrations on both dies must be maintained as the guillotine die is shifted laterally between each successive vertical stroke, otherwise clashing of the two dies will occur, causing excessive wear or actual destruction of the serrated die faces. To assure such interregistration, an elaborate pilot or guiding mechanism has been used to accurately control positioning of the movable guillotine die such as shown in Pat. No. 2,322,204. Alternatively, the sheet metal stock has been laterally oscillated as it is advanced toward the expanding ledge and the guillotine die confined to purely a vertical motion to simplify the task of aligning the die serrations. Both of the foregoing arrangements add considerably to the expense and complication of the machine and, hence, are undesirable.

Another approach to solving the problem is disclosed in Pat. No. 2,609,781. In this construction there disclosed, the metal stock is slit by a serrated cutting knife prior to the expanding operation; accordingly, a conventional machine may be used to expand the metal and the interregistration problem is avoided.

SUMMARY OF THE INVENTION

The methods and machines of the present invention provide an expanded metal product which is uniformly roughened or serrated on the outer surface portion thereof corresponding to the walking surface when the product is used as a non-skid safety walkway or the like (and only on that surface if so desired). The serrations are of a coarse grain and extend uniformly over the desired surface area.

In providing the aforesaid product, the invention obviates the need for interregistration of complementary dies or the use of a serrated slitting knife prior to expanding and also accomplishes the serrating concurrently with the expanding step thereby not adding to the processing time. Because the more complex arrangements of the prior art are avoided and because the single serrating die of the machine of the present invention is not subject to excessive wear and consequently enjoys a long useful life, serrating of the expanded metal is very economically accomplished. Also, the machine is most readily set up to manufacture expanded metal either with or without serrations thereby avoiding costly delays in change over.

A first embodiment of the present invention contemplates advancing sheet metal stock towards an expanding ledge whereat a guillotine-type punching blade drives the metal material below the ledge on successive downward expanding strokes. A second die having a serrated or roughened working face is positioned in alignment with the vertical face of the expanding ledge such that downward strokes of the expanding die brings the working face of the lower die and an interior face of the punching die into a closely adjacent relationship. The interior face of the punching die preferably has a smooth planar surface but at any rate is of a contour so as not to interregister with the serrations of the lower die. It has been found that such an arrangement provides excellent results while resulting in material structural simplifications over the prior art.

The expansion of the metal sheet by the downward force of the punching blade simultaneously causes spaced segments of the metal sheet adjacent the lower die to be forced against and downwardly along the serration of this die so that the outer surface of the expanded metal is cut or scored by the lower die as the sheet is expanded. Thus, the expansion and scoring of the sheet is accomplished in a single operation, and no further means for roughing the expanded sheet are needed.

According to another embodiment of the present invention, the serrating means comprises a plurality of serrating teeth positioned in interregistration with the teeth of the punching die while the laterally spaced, vertical die face of the expanding ledge is made of a planar contour. This embodiment likewise effects a concurrent expanding and serrating of the sheet metal while avoiding the problems or structural complications of prior art methods and apparatus, as explained earlier herein. The methods and apparatus of the present invention are set forth in greater detail later herein.

BRIEF DESCRIPTION OF THE DRAWINGS

The novel features of the present invention are set forth with particularity in the appended claims. The invention together with further objects and advantages thereof may best be understood, however, by reference to the following description taken in connection with the accompanying drawings, in the several figures of which like reference numerals identify like elements, and in which:

FIG. 4 is a view of the machine with the punching die at the base of one downward stroke after expanding a portion of the sheet metal;

FIG. 5 is a front elevational view of the machine several expanding cycles later in the process, showing the guillotine expanding die at the base of an alternate expanding stroke in which the die is laterally shifted from the position of FIG. 4;

FIG. 6 is a sectional view of the machine taken along lines 6—6 of FIG. 5;

FIG. 7 is an enlarged fragmentary view of the fixed serrating or roughening die of the machine;

FIG. 8 is an enlarged fragmentary view taken along lines 8—8 of FIG. 6;

FIG. 9 is a sectional view taken along lines 9—9 of FIG. 8;

FIG. 10 is a sectional view taken along lines 10—10 of FIG. 8;

FIG. 11 is a view taken along lines 11—11 of FIG. 10;

FIG. 12 is a perspective view of a portion of an expanded metal product made according to the embodiment of the invention illustrated in FIGS. 14-16.

FIG. 13 is a sectional view taken along lines 13—13 of FIG. 12;

FIG. 14 is a perspective view of a multi-toothed punching die constructed in accordance with the present embodiment of the invention;

FIG. 15 is an exploded view of a portion of the die of FIG. 14; and

FIG. 16 is a sectional view similar to that of FIG. 9 but depicting the machine of the present embodiment of the invention.

DESCRIPTION OF THE PREFERRED EMBODIMENTS

Figure 1:
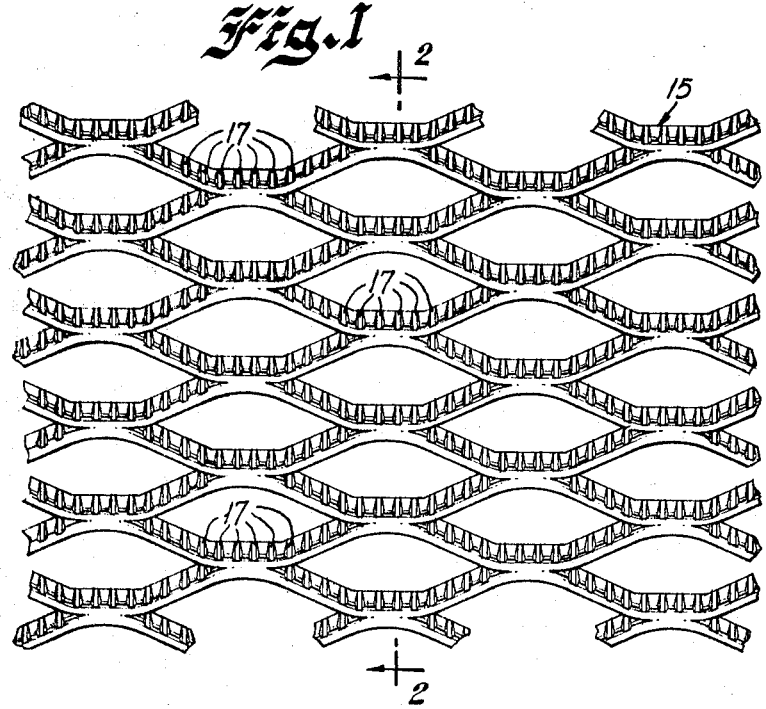
FIG. 1 is a perspective view of a portion of an expanded metal product made according to the embodiment of the present invention illustrated in FIGS. 3-11.
Figure 2:
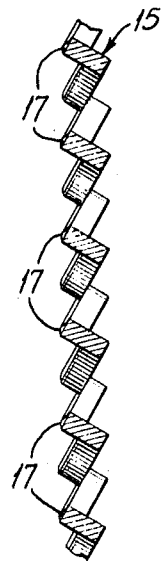
FIG. 2 is a sectional view taken along lines 2—2 of FIG. 1.

Referring now to FIGS. 1 and 2, there is illustrated a section of expanded metal 15 which except for the repetitive pattern of scoring or serrations thereon, indicated typically by the serrations 17, is of conventional outline and configuration and may be made by the conventional guillotine-type machine earlier discussed. The coarse grain serrations, such as 17, are formed only along the top surface of the expanded metal as viewed in FIG. 1, this being the only surface on which they are needed or desired when the product is used as a non-skid walkway or the like. The relative spacing and configuration of the scorings or serrations may be conveniently altered to any of a variety of forms in a manner consistent with the present invention, as will presently become apparent to those skilled in the art. Serrations of the spacing and contour illustrated herein are, however, preferred since it has been found that they provide a sufficiently coarse walking surface without the presence of dangerously sharp edges.

Figure 3:
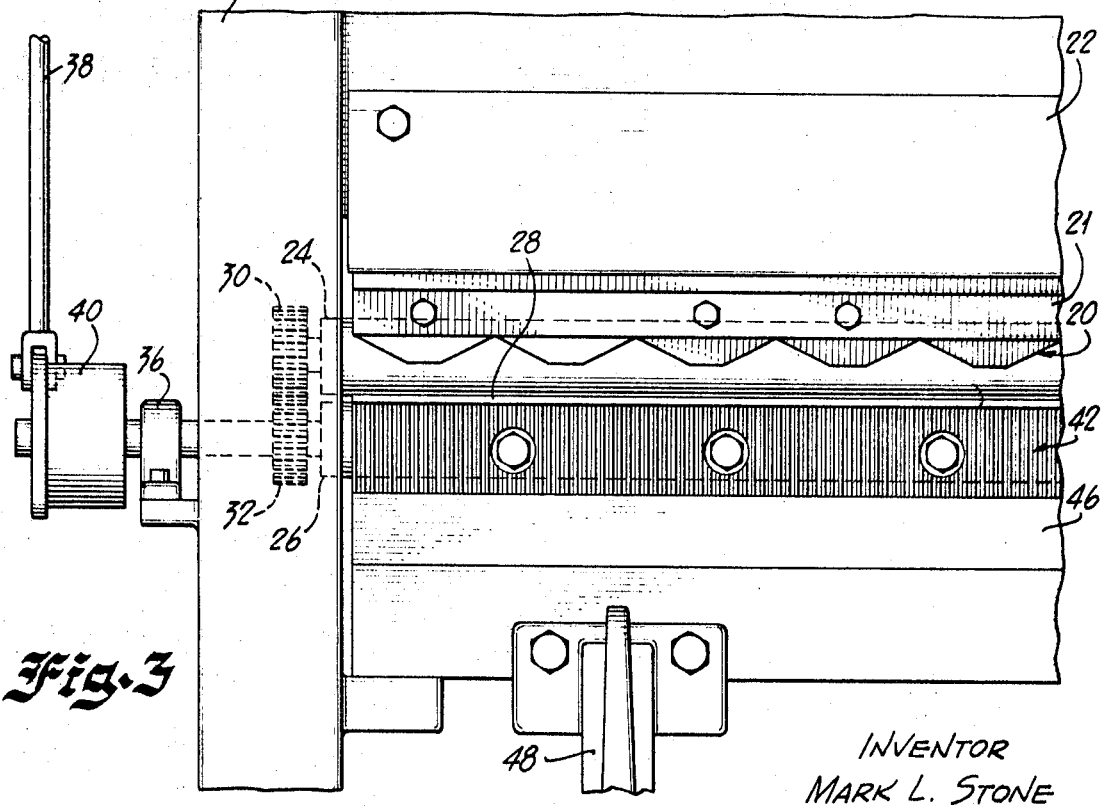
FIG. 3 is a front elevational view of the machine of the present invention with a movable upper and guillotine die positioned above the expanding ledge prepared to vertically descend and expand a leading edge of the sheet metal.

One embodiment of the machine of the invention for manufacturing the serrated expanded metal grating of FIGS. 1 and 2 is illustrated in FIG. 3. Specifically, the machine comprises upper die means in the form of a multi-toothed punching or guillotine die 20 which is removably fastened by bolts to a movable die holder 21, a portion of the die holder being concealed by a transverse frame member 22 of the machine. The member 22 is ultimately supported between a pair of vertical end columns of which one column 23 of the machine is visible in the figure. As will presently be explained, the die holder 21 and its associated punching die 20 are vertically reciprocated by a hydraulic driving system (not shown) while also being shifted back and forth laterally between each successive downward stroke of the die to thereby create the staggered or offset aperture pattern typical of expanded metal.

The present machine also includes means for advancing sheet metal stock along a horizontal bed toward an expanding ledge (defined by the intersection of the horizontal plane of the bed and the vertical front face of the ledge) whereat it is subject to the action of the expanding die 20. This means includes a pair of adjacent elongated rollers 24 and 26 which frictionally engage an intermediate metal sheet 28. The rollers 24 and 26 are driven to advance the sheet metal 28 toward the expanding ledge in a timed synchronism with the movement of the upper die means 20. To this end, the rollers 24 and 26 are interconnected by respective spur gears 30 and 32 with the latter gear being also coupled to a drive axle 34 which is centrally journalled in a support bearing 36. Motion of the axle 34 is controlled through a linkage bar 38 eccentrically mounted on a drive collar 40 of the axle 34. The linkage bar 38 is controlled by the driving apparatus (not shown) for the upper die means 20 and thus advances the sheet metal to the expanding edge in a synchronism with the movement of this die.

The machine of the present invention also includes lower die means comprising a vertically serrated die member 42 defining the vertical face of the expanding ledge and fixedly positioned against a lower die holder 44 (FIG. 6) by a series of bolts. In the present embodiment, the working face of the lower die 42 includes a series of vertically aligned parallel ribs for serrating the outer surface of the metal concurrently with the expanding step. As will presently be explained, the interior face of the upper die member 20, i.e. that surface of the die adapted to overlie the serrated lower die member 42, is preferably of a uniform or planar surface contour so as not to interregister with the ribs of the lower die 42.

Below the die 42, there is provided a slanted guide member 46 for feeding the expanded metal onto a series of spaced guide bars, only one of the bars 48 being visible in the figure. These various guide surfaces direct the expanded metal onto a suitable receiving bed (not shown).

An introduction to the overall operation of the machine and method of the invention is most conveniently had by sequentially considering the FIGS. 3-5 which illustrate the machine in various phases of its operating cycle. In FIG. 3, the guillotine die 20 is poised at its uppermost position about to descend toward the horizontal metal sheet 28, the sheet metal stock having been advanced over the end of the ledge to an appropriate forward position. In FIG. 4, the multi-toothed die 20 has descended vertically below the plane of the expanding ledge and has expanded a first row of slits in the sheet 28. In this regard, it should be understood that the metal sheet may be pre-slit or alternatively the expanding die may concurrently effect a shearing and expanding operation, At any rate, the upper die means is now restored to its original position as it is shifted laterally to the right, after which it again descends in a positive vertical stroke to expand a succeeding row of slits in the metal sheet 28.

A view of the upper die means in this latter position several expanding cycles later in the manufacturing process is provided in FIG. 5. As shown, the upper die means is offset to the right in this figure relative to its position in FIG. 4. As the expanding process continues, the expanded metal sheet progresses downwardly along the forward face of the lower die onto the slanted guide face 46 and is eventually directed by the guide bar 48 onto a receiving bed.

The manner in which the upper die 20 moves downwardly to overlie the face of the lower die 42 can best be understood by reference to FIG. 6. From this view, it may be appreciated that the interior face 20a of the upper die 20 is of a vertically planar contour and reciprocates vertically in a plane which is closely adjacent to or contiguous with the spaced peaks of the serrated die 42. In this regard, an enlarged view of the contour of the working face of the die member 42 is shown in FIG. 7 and, specifically, includes a series of vertically directed ribs 42a separated by intermediate V-shaped valley portions 42b. The peaks of the ribs 42b are truncated, that is, they do not form sharp peaks. This prevents excessive wearing or cutting of the interior face 20a of the die member 20.

An even more detailed understanding of the cooperation of the two dies 20 and 42 to concurrently expand and serrate the metal sheet may be had by reference to FIGS. 8–11. Referring first to FIG. 8, the interaction of the dies is viewed from a position rearwardly of the lower die 42. Hence, the peaks 42b of the spaced ribs and the valleys 42a of the intermediate grooves on the die 42 are shown only in phantom outline in the figure. The punching die 20 is in its lowermost position, having forced spaced segments of the metal sheet 28 below the plane of the sheet and downwardly along the forward face of the serrating die. The result of this action on the sheet metal is clearly visible on those bonds of the expanded metal that have progressed below the lowermost extent of the die 42.

From FIG. 9, it can again be seen that the interior face 20a of the upper die 20 rides along the vertical path which is closely adjacent or contiguous to the peaks of the ribs 42a. The cross-sectional view of FIG. 10, on the other hand, is taken at the base of one of the depressions 42b in the face of the die 42. The interior face 20a of the upper die 20 does not extend into this recess in interregistration therewith although it can be seen that the raised rib 42a has caused a groove to be cut in one of the metal bonds and, accordingly, a tip portion of this bond extends into the recess 42b. The serrations are formed on all of the adjacent bonds in like manner.

The cutting or serration action of the raised ribs 42a of the die 42 is seen from a different perspective in the view of FIG. 11. Therein it can be seen that the action of one tooth of the upper die means 20 in forcing a single metal bond 50 below the plane of the expanding ledge has caused the bond to be so forcefully drawn along the series of ribs 42b that deep serrations have been cut therein. This cutting action occurs despite the fact that the upper die means 20 does not interregister with the die 42. The downward forces of the punching teeth of the upper die coupled with the retaining forces of the integral metal sheet tend to develop a horizontal reaction force urging the metal bonds very strongly into engagement with the raised ribs of the lower die and resulting in the serration of these bonds by the ribs as the metal progresses down the face of the lower die under the influence of the expanding die member.

It will be recognized by those skilled in the art that the arrangement of the present invention requires only the mounting of a serrated or otherwise roughened die member in place of the normal planar vertical face portion of the expanding ledge. The time required to exchange such pieces is minimal and, accordingly, there are no costly shut-downs for tool changeover. Furthermore, it will be recognized that the machine of the invention obviates the need for any additional apparatus to control the extent of lateral shifting of the upper die means within exact limits. Also, the lower die does not encounter excessive wear and has a long and useful life; its ribbed serrations need not be precisely spaced relative to one another and, accordingly, the die is rather inexpensive to make.

Referring now to FIGS. 12 and 13, there is illustrated a portion of an expanded metal product 52 which is similar to that illustrated in FIGS. 1 and 2 excepting for the contour and positioning of the repetitive serration pattern 54 thereon. In this regard, it is observed that the serrations 54 are located only on the metal bonds at the juncture of each pair of expanded metal segments and specifically on only one surface thereof and further that the serrations are of a U-shaped contour. The first two of the foregoing characteristics follow as a consequence of the manufacturing method and apparatus to be described while the latter, i.e., the configuration of the serrations, is a matter of selection as will presently be recognized by those skilled in the art.

The expanded metal product of FIGS. 12 and 13 may be manufactured on the same machine as that previously described herein excepting only that the guillotine-type punching die 20 and the fixedly positioned lower die 42, both visible in FIG. 3, are replaced by dies constructed in accordance with the present embodiment of the invention. More particularly, and with reference to FIG. 14, there is illustrated a guillotine type punching die 56 comprising a plurality of spaced punching teeth 56a of a size, spacing and contour similar to that of the punching die 20. The die 56 includes a planar interior surface portion 56b having a series of bores therein suitable for fastening the die by bolts to the movable die holder 21 (FIG. 3).

The punching die 56 is further provided with integral serrating means including a plurality of serrating members 58 positioned in interregistration with the plurality of punching teeth 56a. Each of the serrating members 58 has a plurality of vertical serrating ribs 58a or the like separated by an intermediate U-shaped recess. The serrating members 58 are each set inwardly a predetermined distance from the planar interior face 56b of the punching die. As will presently be apparent to those skilled in the art, the distance at which the serrating members are set inwardly of the interior die face determines the depth of the metal serration; the contour of the serrations 54 is, of course, determined by the configuration of the vertical ribs 58a which may be varied according to the particular roughening effect desired.

Further, in accordance with the present embodiment of the invention, the fixedly positioned lower serrating die 42 (FIG. 3) is preferably replaced by a conventional die having a planar vertical working surface. A fragmentary view of the machine with the punching die 56 and a planar die 60 installed and operating to produce the expanded metal 52 is provided in FIG. 16 with the same numeral designations being there used to denote machine structure common to the embodiment of FIGS. 3–11. As shown in FIG. 16, the sheet metal 28 is advanced along the bed 44 to a point immediately above the vertical face of the expanding ledge as defined by the vertical face of the fixedly positioned lower die 60. The punching die 56 is mounted on the frame member 21 for reciprocation in a vertical plane with its interior face 56b moving along a vertical plane substantially contiguous the face of the fixedly positioned lower die 60. On the downward stroke of the punching die 56, each of the teeth 56a engages spaced segments of the sheet metal 28 forcing them downwardly along the face of the lower die 60 in an expanding action. Concurrently with the expanding of the spaced metal segments, the serrating members 58 engage, at the plane of the bed 28, the portions of the sheet metal intermediate the spaced segments cutting the serrations 54 therein. Since the serrating members 58 are set inwardly of the interior face of the punching die, the serrations 54 do not extend the full width of each expanded segment, as is desired to preserve the structural integrity of the expanded metal product. A similar expanding and serrating operation occurs on each downward stroke of the punching die with the punching die 56 being shifted laterally intermediate each downward stroke, as earlier explained in connection with the first invention embodiment.

The method and apparatus of the present embodiment of the invention, like the first embodiment, obviate the need for any apparatus to control the extent of lateral shifting of the punching die means within exact limits since there is no interregistration of the upper and lower dies. The present embodiment also provides the other earlier cited features of the first embodiment with the additional advantage that the serrating members 58 have been found to have an even greater resistance to wearing than the serrating ribs 42a of the die 42. Additionally, it will be recognized that the fixedly mounted serrating die 42 and the punching die 60 may be concurrently employed on the same machine, if desired, to provide different roughening effects to the opposite sides of the expanded metal, all without interregistration of the opposed die faces.

While particular embodiments of the present invention have been shown and described, it is apparent that various changes and modifications may be made, and it is therefore intended in the following claims to cover all such modifications and changes as may fall within the true spirit and scope of this invention.

I claim:

1. A machine for manufacturing an expanded metal product having a roughened surface portion adapting said product for use as a non-skid safety walkway or the like, comprising:

first die means having a die surface portion;

feed means having a table portion and adapted for advancing sheet metal along said table to a position directly above said die surface portion of said first die means;

multi-toothed second die means having a die surface portion positioned in opposed facing relation to said die surface portion of said first die means, said second die means being adapted for reciprocating movement in a plane substantially parallel to said die surface of said first die means and between spaced positions lying respectively above and below the plane of said table for forming said sheet metal into expanding metal;

and serrating die means included on only a predetermined one of said first and second die means for roughening said surface portion of said expanded metal concurrently with said second die means driving said sheet metal below said table in an expanding action.

2. The machine of claim 1 in which said serrating die means is included on said second die means.

3. The machine of claim 2 in which said serrating die means comprises a serrating member positioned intermediate each of the teeth of said multi-toothed second die means.

4. The machine of claim 3 in which said serrating members are each integral with said second die means and in which serrating members are set inwardly from said die surface portion of said second die means in a direction away from said opposed surface of said first die means and further in which said serrating members each include a pair of cutting ribs in opposed facing relation to said die surface portion of said first die means for serrating said sheet metal.

5. The machine of claim 1 in which said die surface portion of said first die means includes a series of cutting ribs for providing complementary serrations in said surface portion of said expanded metal and in which said interior surface portion of said second die means is of a planar contour and is adapted for movement in a plane substantially contiguous the peaks of said cutting ribs of said first die means.

6. A method of manufacturing an expanded metal product having a roughened outer surface portion adapting said product for use as a non-skid safety walkway or the like, said method comprising the steps of:

advancing sheet metal along a horizontal plane toward an expanding ledge;

fixedly positioning a lower die means beneath said horizontal plane with a planar working surface thereof defining the vertical face of said expanding ledge;

reciprocating a multi-toothed upper die means in a vertical plane which is laterally positioned so that the planar interior face of said upper die means moves substantially contiguous said planar working surface of said lower die means with said upper die means engaging said sheet metal at said horizontal plane and causing spaced segments thereof to be forced vertically below said horizontal plane in an expanding action;

and serrating the surface portion of said expanded metal product concurrently with said second die means driving spaced segment of said sheet metal below said horizontal plane by fixedly positioning a serrating die having a plurality of spaced cutting teeth on only a predetermined one of said upper and lower die means.

7. A machine for manufacturing an expanded metal product having a roughened top surface portion adapting said product for use as a non-skid safety walkway or the like, comprising:

an expanding ledge having intersecting first and second face portions;

means for advancing sheet metal along said first face portion of said expanding ledge;

multi-toothed upper die means adapted for reciprocating movement in a plane substantially parallel to said second face of said expanding ledge between spaced positions lying respectively above and below said first face of said expanding ledge for forming said sheet metal into expanded metal, said upper die means having an interior face portion oriented in opposed facing relation to said second face portion of said expanding ledge; and lower die means fixedly positioned in predetermined alignment with said second face portion of said expanding ledge and having an uneven working face for roughening said top surface portion of said expanded metal as said upper die means drives said sheet metal below said first face of said expanding ledge, said upper and lower die means being constructed and arranged relative to one another for precluding interregistration of said uneven working face of said lower die means and said interior face of said upper die means.

8. The machine of claim 7 in which said working face of said lower die means includes a series of cutting ribs for providing complementary serrations in said outer surface portion of said expanded metal.

9. The machine of claim 8 in which said interior face of said upper die means is of a planar countour and is adapted for movement in a plane substantially contiguous the peaks of said cutting ribs of said lower die means.

10. The machine of claim 9 and further including:

drive means for laterally shifting said multi-toothed upper die means between successive expanding strokes thereof to form an offset aperture pattern in said expanded metal.

11. The machine of claim 10 in which said advancing means is adapted for moving said sheet metal only in a direction toward said second face of said expanding ledge and in a predetermined time synchronism with the movement of said upper die means.

12. A method of manufacturing an expanded metal product having a roughened outer surface portion adapting said product for use as a non-skid safety walkway or the like by concurrently expanding said sheet metal and roughening said outer surface portion thereof, said method comprising the steps of:

advancing sheet metal along a first plane toward an expanding ledge;

fixedly positioning a lower die member beneath said first plane with its serrated working face defining the vertical face of said expanding ledge;

and reciprocating an upper die member in a second plane transverse to said first plane which second plane is laterally positioned so that the planar interior face of said upper die member moves substantially contiguous the serrated working face of said lower die member and with said upper die member engaging said sheet metal at said first plane and causing spaced segments thereof to be simultaneously forced below said first plane in an expanding action and laterally into the working face of said lower die member for effecting a concurrent expansion and serration of said metal without interregistration of said upper and lower die members.

13. The method of claim 12 in which said lower die member is angularly oriented so that said serrations extend perpendicularly to said first plane and in which said serrating action occurs throughout substantially the entire portion of the downward stroke of said upper die member lying below said first plane.

14. A die for use in a machine of the type having an expanding ledge with a fixedly positioned vertical die face, feed means for advancing sheet metal to said expanding ledge and a reciprocating punching die for expanding said sheet metal in making an expanded metal product, comprising:

punching die means comprising a plurality of spaced punching teeth having planar interior face portions adapted for movement in a vertical plane substantially contiguous the plane defined by said fixedly positioned die face and with said punching teeth adapted to engage and expand spaced segments of said sheet metal in movement of said punching die below said expanding ledge;

and serrating means, integral with said punching die means including a plurality of serrating members positioned in interregistration with said punching teeth and each having a plurality of vertical serrating ribs recessed laterally a predetermined distance from the planar interior face portions of said punching die means and adapted for serrating said sheet metal intermediate said spaced segments concurrently with expansion of said spaced segments by said punching teeth.

References Cited

UNITED STATES PATENTS

| | | | |
|---|---|---|---|
| 594,172 | 11/1897 | Duncan et al. | 29—6.2 |
| 1,292,685 | 1/1919 | Benson et al. | 29—6.2 |
| 2,609,781 | 9/1952 | Gruetjen | 29—6.2X |
| 3,268,974 | 8/1966 | Felsenthal | 29—6.2 |
| 3,295,184 | 1/1967 | Durfield, Jr. | 29—6.2 |

FRANK T. YOST, Primary Examiner

U.S. Cl. X.R.

29—163.5; 83—695